June 15, 1926. Re. 16,363

L. W. CHUBB

VACUUM TYPE INVERTED CONVERTER

Original Filed Nov. 29, 1915 4 Sheets-Sheet 1

WITNESSES:
P. H. Crock.
O. B. Buchanan

INVENTOR
Lewis W. Chubb.
BY
Wesley G. Carr
ATTORNEY

June 15, 1926.

Re. 16,363

L. W. CHUBB

VACUUM TYPE INVERTED CONVERTER

Original Filed Nov. 29, 1915 4 Sheets-Sheet 2

WITNESSES:
T. H. Crock.
O. B. Buchanan.

INVENTOR
Lewis W. Chubb.
BY
Wesley Gloar
ATTORNEY

June 15, 1926.

Re. 16,363

L. W. CHUBB

VACUUM TYPE INVERTED CONVERTER

Original Filed Nov. 29, 1915 4 Sheets-Sheet 3

WITNESSES:
P. H. Rock.
O. B. Buchanan

INVENTOR
Lewis W. Chubb.
BY
Wesley G. Carr
ATTORNEY

June 15, 1926. Re. 16,363

L. W. CHUBB

VACUUM TYPE INVERTED CONVERTER

Original Filed Nov. 29, 1915 4 Sheets-Sheet 4

WITNESSES:
T. H. Rock.
O. B. Buchanan

INVENTOR
Lewis W. Chubb.
BY
Wesley G. Carr
ATTORNEY

Reissued June 15, 1926.

Re. 16,363

UNITED STATES PATENT OFFICE.

LEWIS W. CHUBB, OF SWISSVALE, PENNSYLVANIA, ASSIGNOR TO WESTINGHOUSE ELECTRIC AND MANUFACTURING COMPANY, A CORPORATION OF PENNSYLVANIA.

VACUUM TYPE INVERTED CONVERTER.

REISSUED

Original No. 1,347,894, dated July 27, 1920, Serial No. 64,154, filed November 29, 1915. Application for reissue filed June 11, 1921. Serial No. 476,935.

My invention relates to systems and apparatus for the conversion of direct currents into alternating currents, and it has for its object to provide devices of the character designated which shall be simple and inexpensive in manufacture and highly effective in operation, being particularly adapted for the conversion of currents of high voltage.

Figure 1:
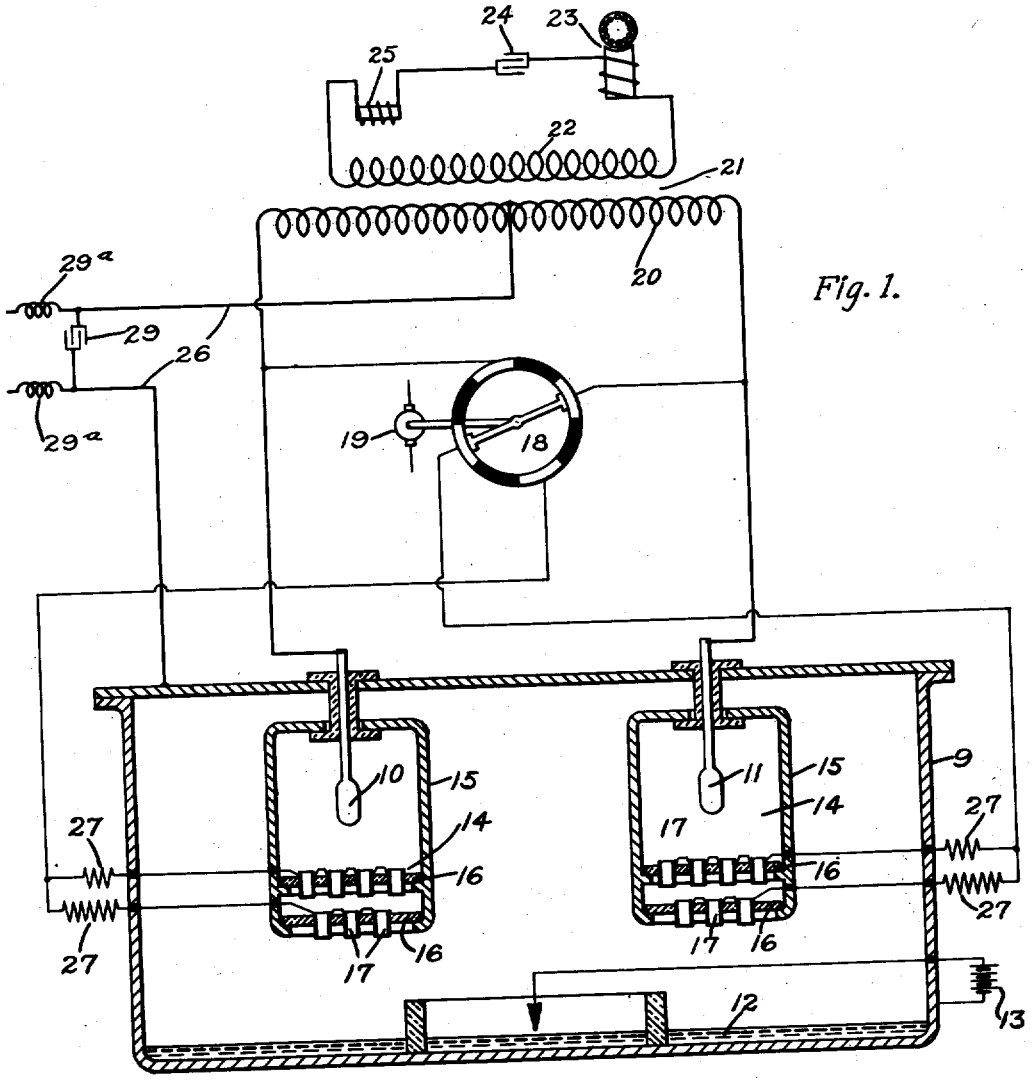
Figure 2:
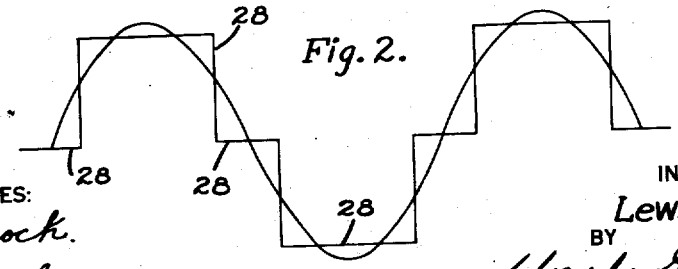
Figure 3:
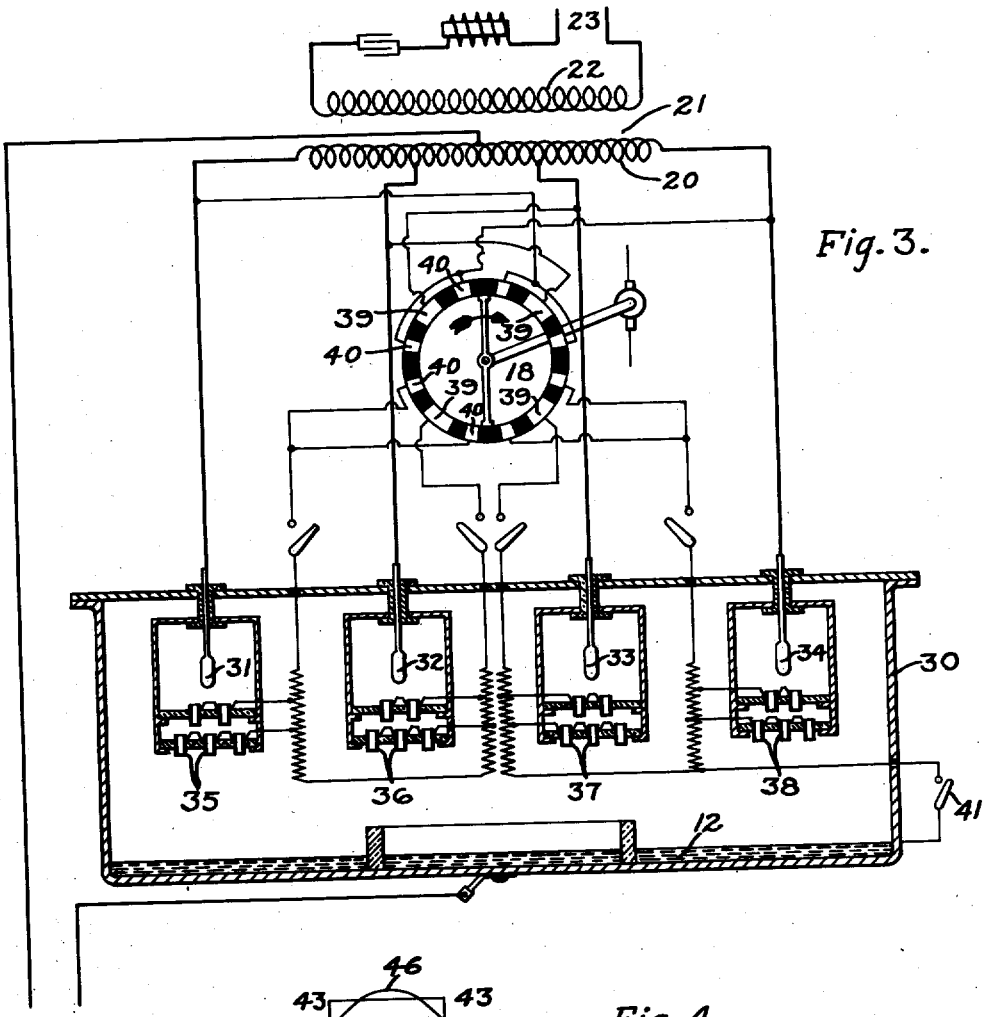
Figure 4:
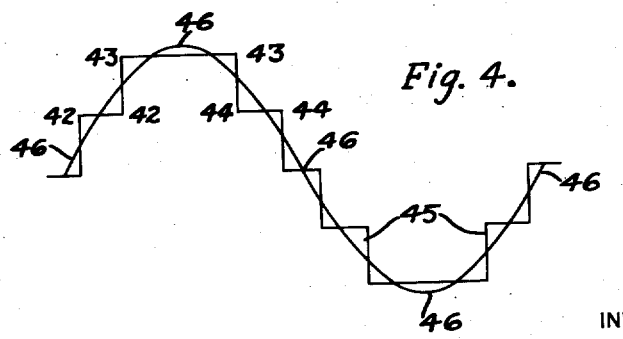
Figures 5, 6:
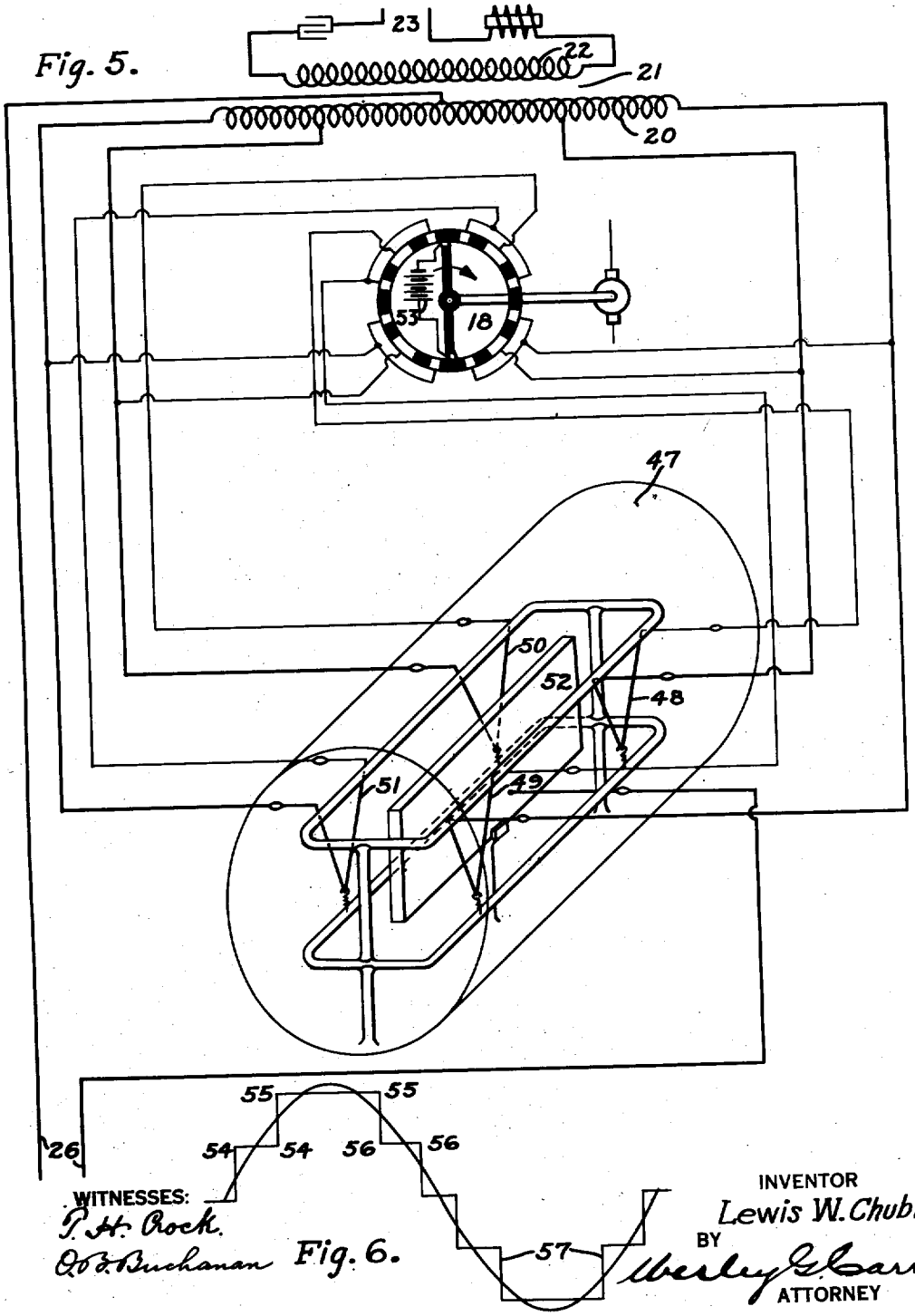
Figure 7:
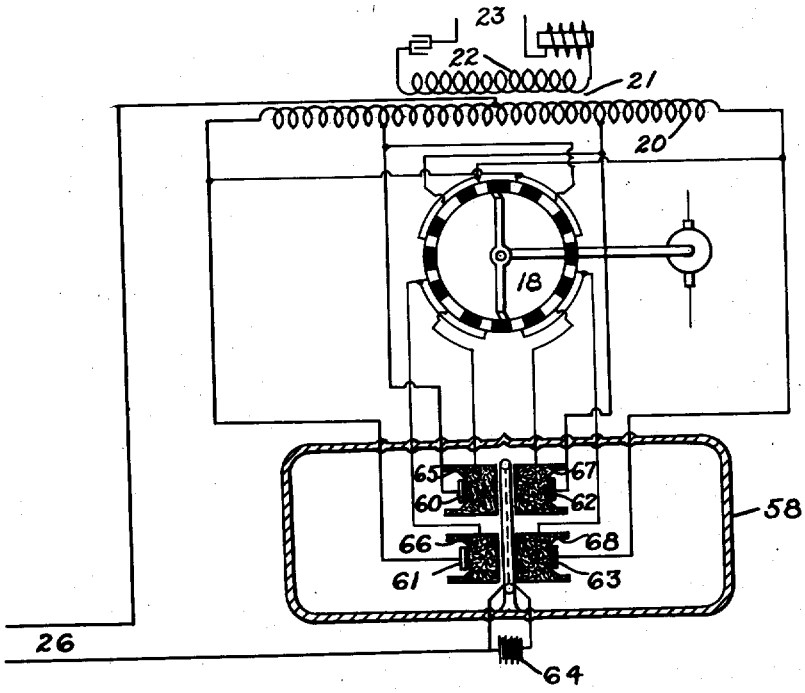
Figure 8:
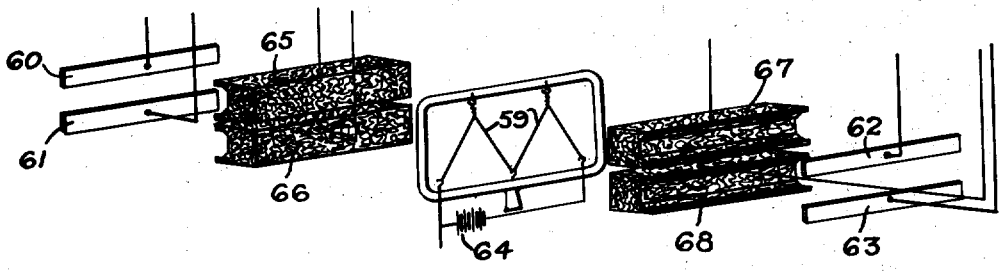

In the accompanying drawing, Fig. 1 is a diagrammatic view of a system of the character described that is adapted to form alternating-current waves in the load circuit having a square-top formation; Fig. 2 is a diagram illustrating the wave form produced in the system of Fig. 1; Fig. 3 is a diagram of a system similar to that shown in Fig. 1 wherein means are provided for approximating a sine-wave form in the load circuit and, furthermore, wherein means are provided for varying the degree of electrostatic control; Fig. 4 is a diagram illustrating the wave form produced in the system of Fig. 3; Fig. 5 is a diagrammatic view of a device similar to that shown in Fig. 3 but employing a plurality of cathodes of the incandescent type, with a thermal control of the electronic emission; Fig. 6 is a diagram, similar to Fig. 4, illustrating the wave form produced in the system of Fig. 5; Fig. 7 is a diagrammatic view of a system embodying a vacuum converter of the pure electron-discharge type, together with a suppressor shield, for the electrostatic control of the arc, having novel characteristics, and Fig. 8 is a view of the converter shown in Fig. 7 with the members thereof spaced apart to show the relative arrangement of the different component parts.

In the operation of systems of electrical distribution, it is frequently desirable to convert energy from the form of direct current into alternating current. In the past, this function has been performed either by inverted rotary converters or by the use of vacuum apparatus which has been more or less unsatisfactory in operation. In the development of a system of high-voltage, direct-current transmission, it is necessary that apparatus be provided for the conversion of high-tension direct current into alternating current at the distributing end of the line. Inverted rotary converters are unsuited for operation at high voltages on account of the difficulties inherent to commutation and, so far is I know, no vacuum apparatus has as yet been developed which will operate at the voltages necessary for the economical operation of a system of the character designated.

It is a well known fact that the arc flows between the electrodes in an evacuated container by virtue of a stream of electrons proceeding from the cathode and impinging upon the anode or anodes. By placing a conducting shield in proximity to an arc path of the character designated and by imparting a negative charge to said conducting member, I am enabled to seriously retard or prevent the flow of an electron stream of the character specified. In like manner, by imparting a positive charge to said conducting shield, the passage of electrons to an anode is facilitated. It follows, therefore, that, by periodically imparting electrostatic charges of various characteristics to said conducting shields, I am enabled to control, in a large measure, the production of alternating current by a device of the character specified when supplied with direct current.

It frequently becomes desirable, or even necessary, to associate, with the alternating current consumption circuit, auxiliary apparatus having a definite frequency, such, for example, as an alternating-current generator or tuning apparatus, in order that there may be a natural agency operating in the alternating-current circuit for determining the frequency thereof. By co-operation between this frequency-determining apparatus and the electrostatic control of suppressor shields within the converter itself, I am enabled to produce an extremely effective control of the current flow.

I have found it convenient to apply, to apparatus of the character designated, the title of "Vacuum type inverted converter," thereby distinguishing from the ordinary vacuum converter or rectifier in the same manner as has hitherto been employed in distinguishing between the ordinary rotary converter and the inverted rotary converter, although it will be understood that my apparatus produces as direct a conversion of energy as is produced in the ordinary rectifier.

I may employ vacuum apparatus of the mercury-vapor type, as commonly employed in the rectification of alternating current or I may employ, with even better results, apparatus of the incandescent cathode type disclosed, for example, in U. S. Patent to Fleming 803,684, or on page 193 of the 1906 edition of a work entitled "Conduction of electricity through gases" by J. J. Thomson. The type of apparatus disclosed in the last mentioned publication produces exceptionally satisfactory results, as the pure electron emission employed readily subjects itself to electrostatic control and as the electrodes are not subject to deterioration because of positive ionic bombardment.

There is no fundamental difference between the operation of a device of the character described by Fleming and a pure electron discharge device of the character described by Thomson. In the Fleming device, the action is analogous to that described on page 489 of the Thomson publication and may be termed a step-by-step action, in that an electron proceeding from the cathode collides with a gas particle and disrupts the same, forming a new positive ion and a new electron. The original electron may lose a large part of its energy and become inert but the newly formed electron proceeds toward the anode. This process may be repeated a great number of times before an electron finally reaches the anode. The positive ions set free by the disruption of the gas particles are drawn to the cathode and by their bombardment thereof produce new electrons therefrom. There is thus established what may be termed a reciprocal action, electrons proceeding from the cathode continuously generating positive ions from the residual gas and said positive ions in turn producing new electrons from the cathode itself. As the vacuum is carried to a higher and higher degree, the number of residual gas particles is reduced and the mean free path of electrons proceeding from the cathode is increased. A condition is soon reached wherein the original electrons which started from the cathode impinge upon the anode itself, and the state of pure electron discharge is approached. By carrying the evacuation still further, the number of gas particles is so reduced that substantially no positive ions are generated within the device, and current is carried entirely by electrons proceeding directly from the cathode to the anode. This is the method of operation which is present in a device of the character described on page 193 of the Thomson publication. One of the most striking advantages of the latter form of apparatus is that the absence of positive ionic bombardment of the cathode prevents the deterioration of the latter and, consequently, tends to produce a device having long life and extremely stable characteristics.

Referring to the accompanying drawing for a more detailed understanding of my invention, I show a container of the type commonly employed in metal-case mercury converters at 9 in Fig. 1. The container 9 is provided with a pair of anodes 10 and 11 and with a cathode 12 of the vaporizable reconstructing type. Any suitable means may be employed for maintaining the cathode 12 in an active condition, such, for example, as a keep-alive circuit 13. The anodes 10 and 11 are each provided with suppressor shields 14 of the character described and claimed in a copending application of S. W. Farnsworth, Serial No. 44,429, filed August 9, 1915, Patent #1,232,470, July 3, 1917; and assigned to the Westinghouse Electric & Manufacturing Company. Briefly described, the shields 14—14 comprise casings 15—15 surrounding the anodes and provided with transverse diaphragms 16—16 in the lower portions thereof. The diaphragms 16—16 support conducting tubular members 17—17, through which an arc from the cathode to the anode is forced to travel. The tubular members 17—17 are adapted to be alternately connected and disconnected from their respective anodes by means of a contact making device 18 which may be driven at any desired speed by a motor 19. The anodes 10 and 11 are connected respectively to the terminals of the primary winding 20 of a transformer 21, the secondary winding 22 of which is connected to an alternating-current consumption circuit 23, preferably provided with tuning devices, such, for example, as a condenser 24 and a reactive coil 25. One terminal of a direct-current supply circuit 26 is connected to the mid point of the primary winding 20, and the other terminal of said supply circuit is connected to the cathode 12 through the casing 9.

Having thus described the construction of a system embodying my invention, the operation is as follows: assuming the direct-current circuit 26 to be energized, with the contact-making device 18 in the position shown, a stream of electrons is at liberty to pass from the cathode 12 to the anode 11, the tubular members 17 of the associated shield 14 being maintained at positive polarity because of their connection to the anode. The formation of an arc to said tubular members is prevented, however, by suitable current-reducing means 27. Any attempt of an electron stream to pass to the anode 10, however, results in the rapid acquisition of a negative potential by the tubular member 17 associated therewith, no outlet being provided for removing such a charge. The negative charge immediately exerts a strong repulsive action and prevents the supply of electrons to the anode 10.

Under the conditions above set forth, direct current flows from the system 26 through the right-hand half of the primary winding 20 and the anode 11 to the cathode 12, from whence it returns to the system 26. A current wave is thereby induced in the secondary winding 22 to flow through the system 23.

When the contact-making member of the device 18 is turned through 90°, the above described conditions are reversed, the tubular members 17 associated with the anode 10 are connected thereto, thus permitting current flow therefrom, and the tubular members 17, associated with the anode 11, acquire a negative charge, preventing the flow of current from said anode. There results a current wave in the left hand half of the primary winding 20 and a resultant impulse in the circuit 23 in the reverse direction from the first mentioned impulse.

When operating at a reasonably high voltage and with large amounts of mercury vapor within the apparatus, there is a strong tendency for an arc operating from an anode to persist after its shield is disconnected and a condition of short circuit is established at the immediately subsequent energization of the shield of the remaining anode.

It may, therefore, be necessary, under the conditions above set forth, to positively choke out the flow of current from an anode at the termination of the wave to be derived therefrom and this may best be done by producing an oscillating current flow through said arc and causing said oscillating discharge to die down to a zero value, as is disclosed and claimed in a copending application of Chas. LeG. Fortescue, Serial No. 850,744, filed July 13, 1914, Patent #1,227,416, May 22, 1917, and assigned to the Westinghouse Electric & Manufacturing Company.

I have found that, with an alternating-current consumption circuit having the ordinary characteristics, it is difficult to operate a device of the character specified in the manner shown, especially at high operating voltages, but, by causing the consumption circuit 23 to have natural periodic characteristics, such, for example, as are provided by the tuning operation of the devices 24 and 25 or by an auxiliary source of alternating current connected thereto, I am enabled to obtain satisfactory operation. The action of said auxiliary apparatus in providing periodic points of zero potential in the circuit 23 is co-ordinated by driving the device 18 at the proper speed and phase relation so that the connections of the tubular member 17 are altered contemporaneously therewith.

The operation of my device may be likened, therefore, somewhat to the operation of an asynchronous generator in that it is necessary that the alternating-current system supplied thereby should have, in itself, means for maintaining a periodic electromotive force for the proper operation of the apparatus supplying current thereto.

The operation of the system shown in Fig. 1 in the manner described produces square-top potential waves in the circuit 23, as indicated by a line 28—28 in Fig. 2. The derivation of a plurality of disconnected and abruptly terminating impulses of the character specified tends to set up surging and other undesirable phenomena in the circuit 26, especially when the latter is of considerable length and of high voltage. This harmful result may be prevented by providing polyphase, vacuum-type converter apparatus, wherein the net derivation of energy from the direct-current supply circuit is uniform, or, if it be desired to employ single-phase apparatus, I may associate surge-damping apparatus with the system 26, such, for example, as the shunting condensive devices 29 and the series inductive devices $29^a$—$29^a$.

Referring now to the form of my invention shown in Fig. 3, I provide means whereby the current wave supplied to the consumption circuit 23 is caused to approximate more closely to a sine wave, thus disturbing the direct-current supply circuit to a lesser degree and providing alternating current which permits more efficient operation of electromagnetic alternating-current apparatus. A container 30 is provided with four anodes 31, 32, 33 and 34 associated, respectively, with tubular suppressing members 35—35, 36—36, 37—37 and 38—38. A contact-making device 18 is provided for periodically connecting the anodes 31 to 34, inclusive, with their suppressor shields and comprises four equally spaced main conducting segments 39—39, each of which is associated with a pair of short conducting segments 40—40, one of which lies on each side thereof. The pairs of short conducting segments are connected together for the electrostatic control of the anodes 31 and 34, whereas the main segments 39—39 are employed for the electrostatic control of the suppressing devices associated with the anodes 32 and 33.

Not only may I connect the anodes 31 to 34, inclusive, to their suppressor shields through the instrumentality of the device 18, but I may connect all the suppressor shields to the cathode 12 through a switch 41 in order to more readily impart a negative charge thereto in the manner set forth and claimed in a copending application of Chas. LeG. Fortescue, Serial No. 44,428, filed August 9, 1915, Patent #1,231,587, July 3, 1917, and assigned to the Westinghouse Electric & Manufacturing Company.

In order that the alternating-current wave induced in the consumption circuit 23 may have a low value, as desired in the incipient stages in the production of a sine wave, it is desirable that the primary winding 20 include a large number of turns, so that the ratio of transformation of the transformer 21 will be low in value and produce the desired low voltage from the circuit 26. If operating under ideal conditions, the number of active turns in the primary member 20 should then be rapidly reduced until the maximum desired voltage is obtained in the secondary circuit 23, whereupon the operation should be reversed and the number of turns in the primary winding 20 should be increased, approaching infinity as a limit. In actual apparatus it is difficult to obtain even an approximation to the above described method of operation because of the expense incident to providing the large amount of necessary apparatus, I may obtain a crude approximation with the apparatus shown in Fig. 3 by connecting the anodes 31 and 34 to the terminals of a primary winding 20 having a large number of turns and by connecting the anodes 32 and 33 to intermediate symmetrically disposed points in said winding.

The operation, in a system of the character described, is as follows: assuming the conducting arm in the device 18 to turn in a clockwise direction, a pair of short-contact making segments 40—40 are first connected together, closing the circuit between the anode 31 and the associated suppressing tubular member 35, and permitting current flow from said anode. An impulse of direct current from the circuit 26 flows through the entire left-hand half of the primary winding 20 and produces a relatively low voltage in the circuit 23, shown, for example, by a step 42—42 in Fig. 4. Contact is next made between a pair of long contact-making segments 39—39, charging the tubular members 36 associated with the anode 32 permitting current flow therefrom and extinguishing the arc flowing from the anode 31, in the manner described and claimed in U. S. patent to Percy H. Thomas, No. 945,006. The current impulse traverses only a small portion of the left-hand half of the primary winding 20 and the resultant high effective ratio of transformation produces a high voltage in the secondary circuit 23, as shown by a line 43—43 in Fig. 4. Contact is next made between another pair of segments 40—40, and the tubular suppressor members 35—35 are again placed in connection with their associated anode 31, producing another low-voltage step in the wave of the circuit 23, shown by a line 45—45. The arc does not readily transfer from the anode 32 to the anode 31, in accordance with the disclosure in the above patent, preferring the better current path offered in the circuit of the anode 32, and it is therefore desirable to oscillate the current to a zero value by the use of an auxiliary condenser or monocyclic square, as disclosed in the above-mentioned application of Chas. LeG. Fortescue. Said current controlling apparatus forms no part of the present invention and is omitted from the drawings for the sake of clearness. In a like manner, the arc must be forcibly extinguished at the anode 31 at the end of the active period.

The same cycle of operation is now followed in connection with the anodes 33 and 34 and the right hand half of the primary winding 20, thus producing the negative half of an alternating-current cycle in the circuit 23 as shown at 45 in Fig. 4.

It is seen that, by increasing the number of anodes in the container 30 and so connecting said anodes as to increase the number of steps in the resultant current wave in the circuit 23, I may approximate a sine wave 46—46 as closely as is warranted by the economic factors associated with the design in question.

As above pointed out, the closure of the switch 41 permits a much more rapid and complete negative electrification of the tubular suppressor members than would be possible were dependence placed solely upon their acquisition of a negative charge from the impact of a stream of electrons. I may, if desired, go a step further and so delicately adjust the size and relation of the suppressor members as to permit current flow to an anode when its associated suppressor members are free and disconnected, and to choke or suppress current flow when said suppressor members are placed in connection with the cathode. Under such circumstances, the contact-making device 18 would be inserted between the respective suppressor members and the cathode. A device of the character specified would operate with less loss than would the system shown in Fig. 3, because there would be little or no energy loss such as is present in current flow from the suppressor shield through a resistance member to an anode, there being solely an electrostatic charging and discharging of the suppressor members.

Referring now to the form of my invention shown in Fig. 5 wherein I avail myself of the phenomenon that an electrode, when highly heated, tends to emit an excess of electrons, I provide a highly evacuated container 47 with four cathodes 48, 49, 50 and 51 of the filamentary type and with an anode 52. A contact-making device 18 is provided, similar to that employed in Fig. 3, and is connected to send impulses of heating current from a direct-current source 53 to the cathodes 48 to 51, inclusive, in succession. The cathodes 48 to 51, inclusive, are connected to the primary winding 20 of the transformer 21 in the same manner as are the anodes 31—34 in Fig. 3. The entire device 47 is highly exhausted and thoroughly treated out as described in the Thompson publication above referred to, so that, when any one of the cathodes thereof is highly heated, there results a pure electron emission and a resultant flow of current from the anode to the cathode, upon the application of proper electromotive force.

Assuming the contact making member of the device 18 to rotate in a clockwise direction, as indicated, a circuit is first closed through the cathode 51, heating the latter to incandescence and permitting current flow from a direct current supply circuit 26 to the anode 52, thence to the cathode 51 and, via the entire left hand half of the primary winding 20, to the source 26. There results an induced voltage in the circuit 23 indicated by a step 54—54 in Fig. 6. Heating current is next supplied to the cathode 50 and then reapplied to the cathode 51, producing the steps 55—55 and 56—56 in Fig. 6 in the same manner as explained at length in connection with Figs. 3 and 4. In like manner, the energization of the cathodes 48 and 49 then produces the negative half 57—57 of the alternating-current wave in Fig. 6.

When employing apparatus of the character described, it is not necessary to oscillate the current to a zero value by the use of auxiliary apparatus when it is desired to extinguish the arc to an electrode.

I have found that, owing to the considerable mass of the cathodes 48 to 51, inclusive, it is difficult to heat and cool the same with sufficient rapidity to produce alternating current of commercial frequencies in the circuit 23. I may, however, resort to the use of suppressor shields in a pure electron-discharge device, as shown in Figs. 7 and 8. An evacuated container 58 is provided with a relatively large filamentary cathode and with four anodes 60, 61, 62 and 63 arranged adjacent thereto. The cathode 59 is maintained in an electron-emitting condition by any suitable means, such, for example, as a source of heating current 64. Suppressor shields 65, 66, 67 and 68, formed preferably of closely interwoven or intermeshed masses of refractory wire, such, for example, as tungsten or molybdenum, are associated respectively with the anodes 60 to 63, inclusive, and interposed between said anodes and the cathode 59. A contact making device 18 is employed to successively make contact between each anode and its attendant suppressor shield in the same manner as set forth in connection with Fig. 3. The negative electron emission from the cathode 59 is therefore directed to each of the anodes in succession in such sequence as to produce the desired wave shape in the circuit 23.

It will be understood that, in all cases, I maintain such inter-relation between the natural frequency of the circuit 23 and the velocity of the device 18 as to cause these two features to co-ordinate in the release and suppression of energy flow from the direct-current supply circuit, so as to produce the desired operation.

Throughout this description, I have explained the action of my device in accordance with the theory which seems most plausible in view of the present knowledge of the underlying phenomena. I desire it to be distinctly understood, however, that I do not confine myself to said theory of operation but merely present the same to aid in an understanding of the case.

While I have shown my invention in its preferred form, it will be obvious to those skilled in the art that it is susceptible of various minor changes and modifications without departing from the spirit thereof, and I desire, therefore, that only such limitations shall be placed thereupon as are imposed by the prior art or are specifically set forth in the appended claims.

I claim as my invention:

1. The combination with a direct-current supply circuit, of an alternating-current consumption circuit, a vacuum-type inverted converter interlinking said two circuits, and means associated with said converter for approximating a sine wave in the alternating current produced thereby.

2. The combination with a direct-current supply circuit, of an alternating-current consumption circuit, a vacuum-type inverted converter interlinking said two circuits, and means associated with said converter for producing a plurality of steps in the wave form of the alternating current produced thereby, whereby a sine wave may be approximated.

3. The combination with a direct-current supply circuit, of an alternating-current consumption circuit, a vacuum-type inverted converter interlinking said two circuits, means for tuning said alternating-current circuit to the desired frequency, and means associated with the converter for responding to said frequency and for exerting a resultant controlling action on the operation of the converter, 4. The combination with a direct-current supply circuit, of an alternating-current consumption circuit, an inverted converter interlinking said two circuits, and voltage-adjusting-and-switching mechanisms dynamically associated with said converter, said switching mechanism being operable to periodically vary the voltage-ratio of said voltage-adjusting mechanism, whereby the voltage supplied to said consumption circuit may be periodically varied and a sine wave of electromotive force impressed thereon.

5. The combination with a direct-current supply circuit, of an alternating-current consumption circuit, an inverted converter and adjustable-ratio transformer interlinking said two circuits, and switching mechanism for varying the ratio of said transformer, whereby the voltage supplied to said consumption circuit may be periodically varied and an approximate sine wave of electromotive force impressed thereupon.

6. The combination with a direct-current supply system, of an alternating-current consumption circuit, a transformer having its secondary winding connected to said consumption circuit and having a plurality of voltage taps on its primary winding, a vacuum-type inverted converter comprising a plurality of electrodes of one nominal polarity, at least one electrode of the opposite nominal polarity and electron-controlling means interposed between the respective electrodes for controlling current flow therebetween, a connection from each of said first named electrodes to one of said primary-voltage taps, respectively, and switching mechanism arranged to periodically and alternately energize the electron-controlling means associated with relatively widely separated taps and relatively closely connected taps, whereby the electro-motive force supplied to said consumption circuit may be caused to approximate a sine wave.

7. The combination with a direct-current supply circuit, of an alternating-current consumption circuit, a mercury-arc inverted converter interlinking said two circuits, said converter embodying means for rapidly changing its conductivity from a condition of low impedance to a condition of high impedance, and vice versa, whereby said periods of changing conductivity occupy a brief part of a cycle, and tuned reactance means associated with said consumption circuit.

8. The combination with a direct-current supply circuit, of an alternating-current consumption circuit, a mercury-arc inverted converter interlinking said two circuits, said converter embodying means whereby the voltage of said converter suddenly rises to high values, remains at such values for an interval of time, and suddenly drops to low values, and a tuned circuit coupled to said consumption circuit, whereby said tuned circuit carries substantially sinusoidal currents.

9. The combination with a direct-current supply circuit, of an alternating-current consumption circuit, a vacuum-type inverted converter interlinking said two circuits and embodying an evacuated container provided with a pair of electrodes and with a conducting shield adjacent the intervening current path, means for developing an auxiliary periodic electromotive force in said alternating-current circuit, connecting means associated with said consumption circuit for controlling the potential of said shield and means for varying the connections of said connecting means.

10. The combination with a direct-current supply circuit, of an alternating-current consumption circuit, a vacuum-type inverted converter interlinking said two circuits and embodying an evacuated container provided with a pair of electrodes and with a conducting shield adjacent the intervening current path, tuned reactance means associated with said consumption circuit, connecting means associated with said consumption circuit for controlling the potential of said shield and means for varying the connections of said connecting means whereby the alternating current flowing through said converter may be controlled.

11. The combination with a direct-current supply circuit, of an alternating-current consumption circuit, a vacuum-type inverted converter interlinking said two circuits and including two electron paths and an anode and a shield for each of said electron paths, said alternating-current consumption circuit including an inductance coil having its terminals connected to said anodes, one of the terminals of said direct-current circuit being connected to an intermediate point of said coil, the other terminal being connected to the cathode terminals of said electron paths, means for developing an auxiliary periodic electromotive force in said alternating-current circuit, connecting means associated with said consumption circuit for controlling the potentials of said shields, and means for varying the connections of said connecting means.

12. The combination with a direct-current supply circuit, of an alternating-current consumption circuit, a vacuum-type inverted converter interlinking said two circuits and including two electron paths and an anode and a shield for each of said electron paths, said alternating-current consumption circuit including an inductance coil having its terminals connected to said anodes, one of the terminals of said direct-current circuit being connected to an intermediate point of said coil, the other terminal being connected to the cathode terminals of said electron paths, a tuned circuit coupled to said coil, connecting means associated with said consumption circuit for controlling the potentials of said shields and means for varying the connections of said connecting means whereby the alternating currents flowing through said converter may be controlled.

13. The combination with a direct-current supply circuit, of an alternating-current consumption circuit, a vacuum-type inverted converter interlinking said two circuits and including a plurality of electron paths and a shield for each of said electron paths, tuned reactance means associated with said consumption circuit, connecting means associated with said consumption circuit for controlling the potentials of said shields and means for varying the connections of said connecting means whereby the alternating currents flowing through said converter may be controlled.

In testimony whereof, I have hereunto subscribed my name this 8th day of June, 1921.

LEWIS W. CHUBB.